United States Patent [19]

Ki-Dong et al.

[11] Patent Number: 5,599,255
[45] Date of Patent: Feb. 4, 1997

[54] PEDAL ARRANGEMENT FOR AUTOMOBILE ACCELERATION AND BRAKING

[76] Inventors: Kim Ki-Dong, 355-184, Singil 3-Dong, Yongdungpo-Gu, Seoul 150-053; Chae Soo-Chul, 13-18, Sinsa-Dong, Unpyong-Gu, Seoul 122-080, both of Rep. of Korea

[21] Appl. No.: 361,108

[22] Filed: Dec. 21, 1994

[51] Int. Cl.$^6$ .................................. B60K 41/20
[52] U.S. Cl. .................. 477/211; 74/474; 477/212; 477/214
[58] Field of Search .................. 477/210, 211, 477/212, 213, 214, 215, 216, 217; 74/474, 562, 560, 561, 562.5, 512, 513

[56] References Cited

U.S. PATENT DOCUMENTS

| | | | |
|---|---|---|---|
| 1,706,049 | 3/1929 | Vandivier | 477/212 |
| 2,083,940 | 6/1937 | Burton et al. | 477/215 |
| 2,119,299 | 5/1938 | Smith | 477/210 |
| 2,203,777 | 6/1940 | Detmers | 477/212 |
| 2,280,859 | 4/1942 | Siesennop | 74/513 |
| 2,738,862 | 3/1956 | England | 477/210 |
| 2,856,042 | 10/1958 | England | 477/212 |
| 3,331,479 | 7/1967 | Pascual | 74/560 |
| 3,635,316 | 1/1972 | Rogers et al. | 477/210 |

*Primary Examiner*—Charles A. Marmor
*Assistant Examiner*—Sherry Lynn Estremsky
*Attorney, Agent, or Firm*—Michael J. Striker

[57] ABSTRACT

A pedal arrangement for accelerating and braking an automobile comprises a brake pedal having a brake arm, an acceleration pedal having one end which is pivotally fixed to a lower side of the brake arm of the brake pedal and another end which extends upwardly beyond the brake pedal, error operation preventing and returning means provided for the brake pedal, and error operation preventing means provided for the acceleration pedal.

2 Claims, 3 Drawing Sheets

1

PEDAL ARRANGEMENT FOR AUTOMOBILE ACCELERATION AND BRAKING

BACKGROUND OF THE INVENTION

The present invention relates to a pedal arrangement for acceleration and braking of an automobile.

In existing automobiles an acceleration pedal and a brake pedal are formed and mounted as separate pedals. Therefore, when it is necessary to brake during running a foot which was positioned on a gas pedal has to be firstly released and then the brake pedal has to be pressed again by that foot. Therefore, it is frequently not possible to promptly react to dangerous and sudden situations which require fast braking. A time for moving the foot from the acceleration pedal to the brake pedal for a sudden braking is approximately 0.35 seconds, therefore a braking distance of the automobile becomes long and as a result rear end collision accidents or human life accidents can occur. It is also known that some accidents were caused by drivers who unintentionally stepped on the acceleration pedal instead of the brake pedal.

SUMMARY OF THE INVENTION

Accordingly, it is an object of the present invention to provide a pedal arrangement which can be used for acceleration and braking of an automobile and formed so that an acceleration operation or a braking operation can be selected by a front or a sole of a foot, without moving the foot sidewards during accelerating or braking a car.

As a result, a driver can immediately react to a dangerous situation which requires sudden braking or sudden acceleration, and at the same time error operations upon accelerating or braking can be effectively prevented.

In keeping with these objects and with others which will become apparent hereinafter, one feature of the present invention resides, briefly stated, in a pedal arrangement, which comprises a brake pedal having a brake arm, and an acceleration pedal having one end which is pivotally fixed at a lower side of the brake arm of the brake pedal and another end exposed upwardly from a top end portion of the brake pedal, an error operation preventing and returning means provided for the brake pedal adjacent to a lower portion of a piston rod connected with a brake arm, and an error operation preventing means of the acceleration pedal provided adjacent to a lower portion of the acceleration pedal.

When the pedal arrangement is designed in accordance with the present invention it eliminates the disadvantages of the prior art and provides for the above mentioned highly advantageous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
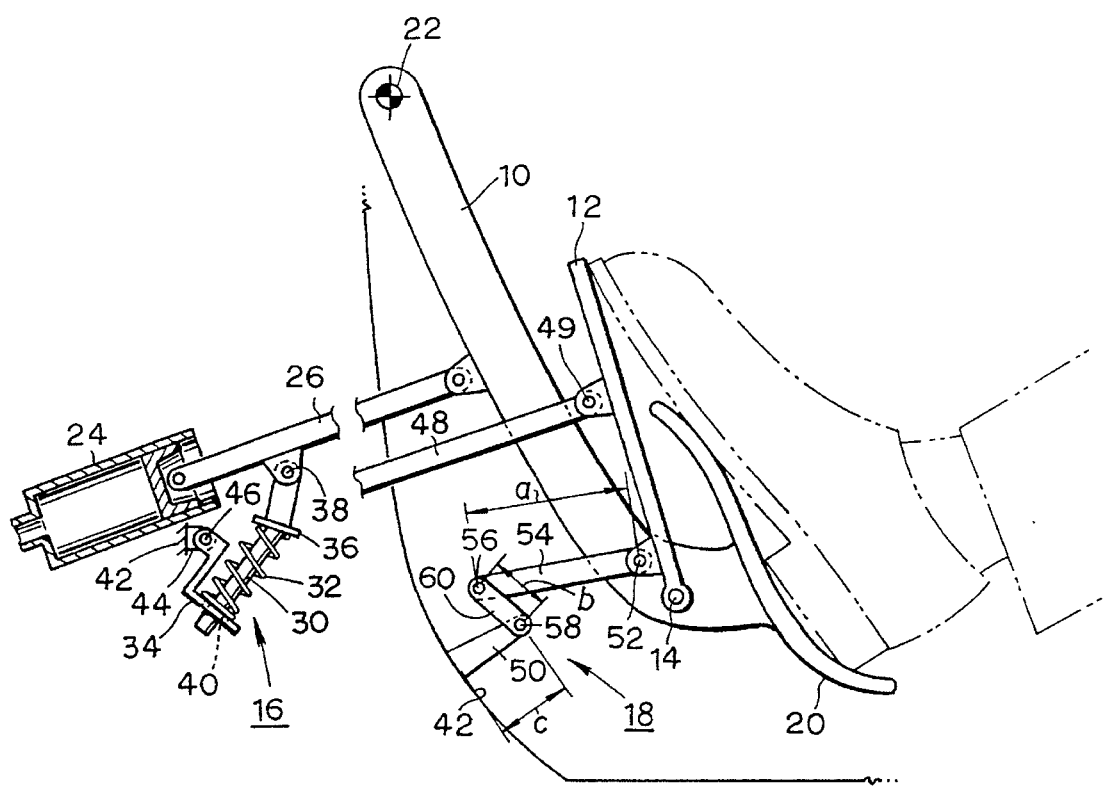
FIG. 1 is a schematic side view of a pedal arrangement for acceleration and braking of an automobile, in accordance with the present invention.

A pedal arrangement in accordance with the present invention has an acceleration pedal which is identified with reference numeral 12 and a brake pedal which is identified with reference numeral 20. One end of the acceleration pedal 12 is pivotally connected by a pivot 14 to one side of a lower end portion of a brake arm 10 of the brake pedal 20.

The arrangement is provided with an error operation preventing and returning means 16 for the brake pedal, which means is arranged at a central portion of a rear surface of the brake arm 10. The arrangement is further provided with an error operation preventing means 18 for the acceleration pedal, which means is arranged at a rear lower portion of the acceleration pedal 12. The brake arm 10 is formed similarly to a conventional brake arm for brake operating means. The brake pedal 20 is mounted on the lowermost end of the brake arm 10, while the uppermost end of the brake arm 10 is pivotally connected by a pivot 22 to a car body. The brake arm 20 is link-connected to a piston rod 26 and to a brake master cylinder 24. The error operation preventing means 16 for the brake pedal include a rod 30, a coil spring 32 associated with the rod 30, and an L-shaped spring support 34.

The rod 30 has a flange 36 which supports one end of the coil spring 32 and is connected to the piston rod 26 by a pin 38. The spring support 34 is connected to a bracket 44 fixed to a car body 42 by a pin 46 and formed as a whole 40 for insertion of the rod 30.

The acceleration pedal 12 is connected to a throttle valve operating lever 48 by a pin 49. This construction is conventional for general acceleration operating means of automobiles.

The error operation preventing means 18 for the acceleration pedal include a fixed link 50 which is attached to the car body 42, a first link 54 connected to the acceleration pedal 12 at one end by a pin 52, and a second link 60 which is link-connected to the first link 54 at one end by a pin 56 and is link-connected to the fixed link 50 at one end by a pin 58.

In the inventive arrangement, if the length of the first link 54 is identified as a, the length of the second link 60 is identified as b, and the length of the fixed link 50 is identified as c, then the length ratio of the above identified links will be as follows:

$$b<c<a.$$

As shown in FIG. 1 the acceleration pedal 12 is pivotally connected by a pivot 14 to the brake arm 10 so as to extend upwardly beyond the brake pedal 20. Therefore, it can be operated by a front end of a foot, when a driver puts a foot on the brake pedal 20.

Figure 2:
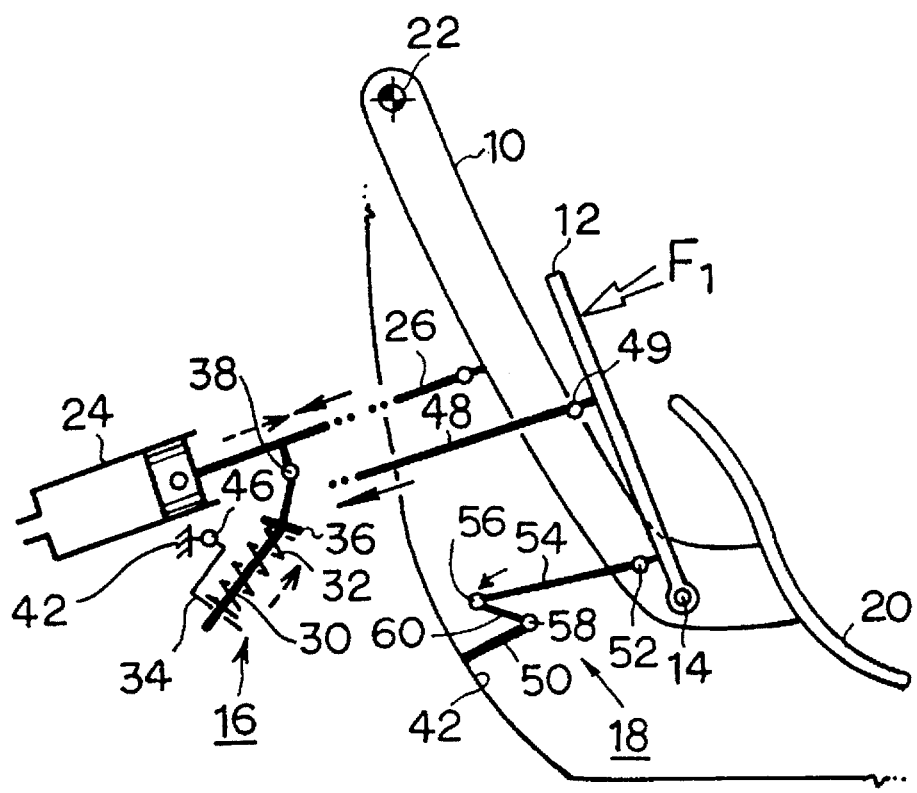
FIG. 2 is a view illustrating an operation of the inventive arrangement for acceleration of an automobile.

The pedal arrangement in accordance with the present invention operates in the following manner:

When a user steps on the acceleration pedal 12 as shown in FIG. 2, the acceleration pedal moves forward around the pivot 14 of the brake arm 10 by a stepping force F1, and the throttle valve operating lever 48 is displaced. At this moment, since the second link 60 of the error operation preventing means 18 for the acceleration pedal connected to the acceleration pedal 12 is directly connected to the acceleration pedal 12 by a pin 52 and connected to the first link 54 for moving forward together with the acceleration pedal 12 by a pin 56, it rotates counterclockwise around the pin 58 of the fixed link 50 which is fixed to the car body 42.

Since the first link 54 moving forward together with the acceleration pedal 12 rotates the second link 60 counterclockwise and simultaneously is successively moved forward, it does not disturb the acceleration pedal 12 to move forward around the pivot 14 of the side of the brake arm 10. Since a foot of a driver is always located on the brake pedal 20 upon stepping on the acceleration pedal 12, the brake arm 10 is also going to move forward. At the same time the rod 30 of the error operation preventing and returning means 16 for the brake pedal connected to the piston rod 26 by a pin 38 is also moving forward. However, at this moment since the spring support 34 is connected with a car body 42 by a pin 46, it swings counterclockwise around a pin 46 simultaneously with compressing the coil spring 32. At the same time, a repulsive force corresponding to the compressing force is produced by the coil spring 32 and operates as a force which moves the rod 30 upwardly, so as to suppress an undesired advancing movement of the piston rod 26.

In a different position when a driver steps on the brake pedal 20 as shown in FIG. 13, the brake pedal 20 moves forwardly around the pivot 22 by a stepping force F2. Therefore the brake master cylinder 24 connected to the brake arm 10 and the piston rod 26 is operated. At this moment, since the force F2 of stepping the brake pedal 20 is greater than the resilient force of the coil spring 32 of the error operation preventing and returning means 16 for the brake pedal, the rod 30 and the spring support 34 are displaced counterclockwise. Since the coil spring 32 is compressed, forward movement of the piston rod 26 is not disturbed. Also, the advancing movement of the acceleration pedal 12 at a time when the brake arm 10 is moved by stepping on the brake pedal 20 is prevented by the error operation preventing means 18 of the acceleration pedal.

In other words, when the brake arm 10 is moved forward, since the pivot pin 14 of the acceleration pedal 12 is also moved forward, the first link 54 connected to the bottom side of the acceleration pedal 12 by a pin 52 is very long and its length a is greater than the length c of the second link 60. Therefore, the second link 60 connected to the fixed link 50 by a pin 58 and having a short length a rotates counterclockwise around the pin 56 to assume a position shown in FIG. 3.

Since the error operation preventing means 18 for the acceleration pedal is in a state that it is impossible to move it any more even if by mistake a driver steps on the acceleration pedal 12 upon sudden braking, the error operation preventing means 18 for the acceleration pedal suppress any advancement of the acceleration pedal 12. Therefore the acceleration pedal is not operated when a braking is performed by a driver. Even if the error operation preventing means 18 for the acceleration pedal is in a state of FIG. 3, since the forward movement of the brake arm 10 is not disturbed it is not influenced at all for the braking operation.

Figure 3:
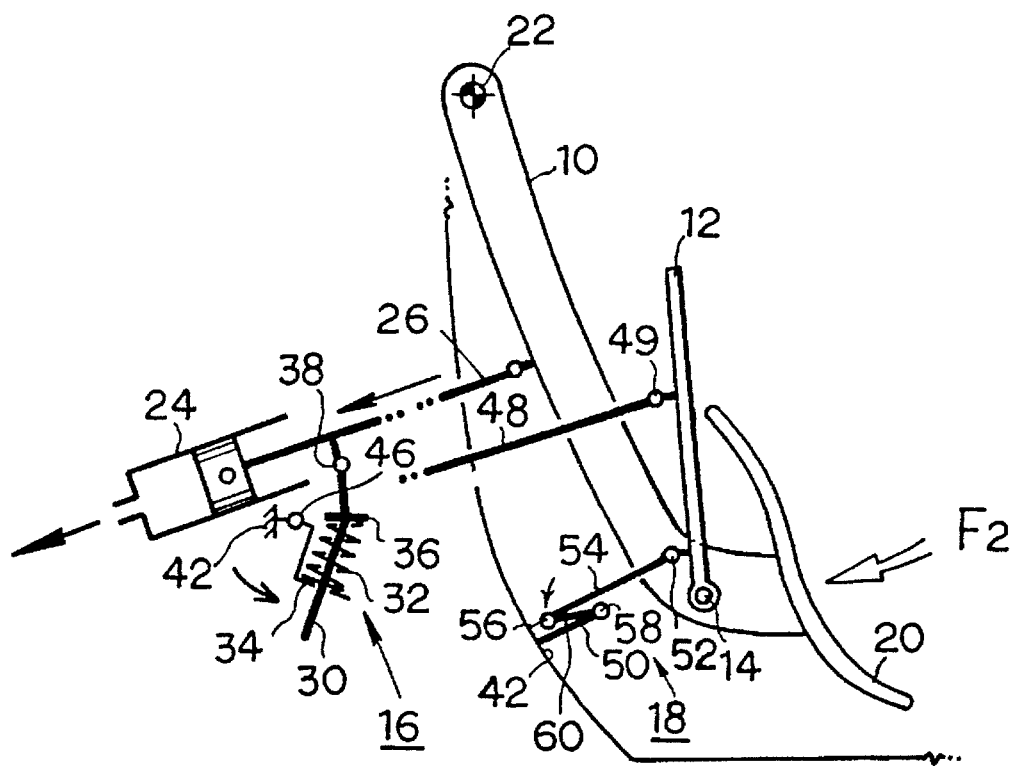
FIG. 3 is a view showing an operation of the inventive arrangement for braking of an automobile.

With the error operation preventing and returning means 16 for the brake pedal, even if the coil spring 32 has a considerably great resilient force, it is possible to step on the brake pedal 20 by a small force. As shown in FIG. 3, when a driver steps on a brake pedal 20, since the piston rod 26 is advanced and the spring support 24 is rotated counterclockwise around the pin 46, the repulsive force of the coil spring 32 operates almost perpendicularly to the piston rod 26. Accordingly, a repulsive force disturbing an advancement of the piston rod is almost offset. Even if a coil spring 32 has a great resilient force, the brake pedal 20 allows stepping on the brake pedal with even a small force.

It is therefore to be understood that when the error arrangement is designed in accordance with the present invention, a driver of an automobile can operate the acceleration pedal 12 and the brake pedal 20 safely as well as speedily and selectively without moving his foot sideways for accelerating and braking operations and without any mutual interference. Therefore, a driver can promptly react to dangerous situations which require sudden braking or sudden acceleration during driving.

It will be understood that each of the elements described above, or two or more together, may also find a useful application in other types of constructions differing from the types described above.

While the invention has been illustrated and described as embodied in a pedal arrangement for automobile acceleration and braking, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A pedal arrangement for accelerating the braking an automobile, comprising a brake pedal having a brake arm connected with a piston rod; an acceleration pedal having one end which is pivotally fixed to a lower end of said brake arm of said brake pedal and another end which extends upwardly beyond said brake pedal; error operation preventing and returning means provided for said brake pedal; and error operation preventing means provided for said acceleration pedal, said error operation preventing and returning means for said brake pedal being connected by a pin to a lower portion of said piston rod and having an L-shaped spring support, a bracket connected by a pin to said spring support, an additional rod having a flange and inserted in said bracket, and a coil spring associated with said rod and located between said support and said flange.

2. A pedal arrangement for accelerating and braking an automobile, comprising a brake pedal having a brake arm; an acceleration pedal having one end which is pivotally fixed to a lower end of said brake arm of said brake pedal and another end which extends upwardly beyond said brake pedal; error operation preventing and returning means provided for said brake pedal; and error operation preventing means provided for said acceleration pedal, said acceleration pedal error operation preventing means including a first link connected to a bottom portion of said acceleration pedal and having a length a, a fixed link which is fixed to a car body and having a c length, and a second link which is connected by a link between said first link and said fixed link and has a b length, said lengths having the following ratio:

b<c<a.

* * * * *